(12) United States Patent
Katada

(10) Patent No.: US 10,355,573 B2
(45) Date of Patent: Jul. 16, 2019

(54) LINEAR VIBRATION MOTOR

(71) Applicant: Nidec Copal Corporation, Tokyo (JP)

(72) Inventor: Yoshinori Katada, Tokyo (JP)

(73) Assignee: Nidec Copal Corporation, Tokyo (JP)

( * ) Notice: Subject to any disclaimer, the term of this patent is extended or adjusted under 35 U.S.C. 154(b) by 157 days.

(21) Appl. No.: 15/465,173

(22) Filed: Mar. 21, 2017

(65) Prior Publication Data

US 2017/0279343 A1    Sep. 28, 2017

(30) Foreign Application Priority Data

Mar. 23, 2016   (JP) .................................. 2016-058691

(51) Int. Cl.
  *H02K 5/16*     (2006.01)
  *H02K 33/16*    (2006.01)

(52) U.S. Cl.
  CPC .............. *H02K 33/16* (2013.01); *H02K 5/16* (2013.01)

(58) Field of Classification Search
  CPC ................................ H02K 33/16; H02K 5/16
  USPC ......................................... 310/15, 81, 36, 13
  See application file for complete search history.

(56) References Cited

U.S. PATENT DOCUMENTS

| 7,884,516 | B2 * | 2/2011 | Iwashima ............... | F16C 17/08 |
| | | | | 310/254.1 |
| 2013/0169071 | A1 * | 7/2013 | Endo ...................... | H02K 33/02 |
| | | | | 310/25 |
| 2016/0006332 | A1 * | 1/2016 | Liao ........................ | H02K 33/16 |
| | | | | 310/29 |

FOREIGN PATENT DOCUMENTS

JP           2016013554 A       1/2016

* cited by examiner

*Primary Examiner* — Naishadh N Desai
(74) *Attorney, Agent, or Firm* — Troutman Sanders LLP

(57) ABSTRACT

A linear vibration motor comprises a frame wherein a coil is secured, and a movable element that comprises a magnet portion and a weight portion, and which is supported elastically within the frame, wherein the movable element comprises guide shafts that protrude in both axial-direction sides; the frame comprises a bottom frame that has a bottom plate portion along the axial direction, and a pair of side frames that have side plate portions and that face the axial direction; the side frame has a bearing retaining portion for holding a bearing that bears a guide shaft, and a connecting portion for connecting the bearing retaining portion to the side plate portion; the bearing retaining portion and the connecting portion are structured integrally with the side plate portion; and the bottom plate portion has an opening portion with which the bearing retaining portion engages.

6 Claims, 5 Drawing Sheets

Cross-Section along A-A

LINEAR VIBRATION MOTOR

CROSS-REFERENCE TO RELATED APPLICATIONS

This application is based upon and claims the benefit of priority of the prior Japanese Patent Application No. 2016-058691, filed on Mar. 23, 2016, the entire contents of which are incorporated herein by reference.

FIELD OF TECHNOLOGY

The present invention relates to a linear vibration motor.

BACKGROUND

Vibration motors (or "vibration actuators") are built into mobile electronic devices, and are broadly used as devices to communicate to the user, through a vibration, that there is an incoming call, or that a signal, such as an alarm, has been generated, and have become indispensable devices in wearable devices, which are carried on the body of the user. Moreover, in recent years vibration motors have been of interest as devices by which to achieve haptics (skin-sensed feedback) in the human interfaces such as touch panels.

Among the various forms of vibration motors that are under development, there is interest in linear vibration motors that are able to generate relatively large vibrations through linear reciprocating vibrations of a movable element. A conventional linear motor is provided with a weight and a magnet on a movable element side, where an electric current is applied to a coil that is provided on the stator side to cause the Lorentz forces that act on the magnet to form a driving force, to cause the movable element, which is elastically supported along the direction of vibration, to undergo reciprocating vibrations in the axial direction (see, for example, Japanese Unexamined Patent Application Publication No. 2016-13554).

SUMMARY

With smaller and thinner mobile electronic devices there is the need for smaller and thinner vibration motors to be equipped therein. In particular, in electronic devices that are provided with flat-panel display portions, such as smartphones, the space within the device in the direction of thickness, which is perpendicular to the display panel, is limited, and thus there is a strong need for the vibration motor, which is equipped therein, to be thinner.

On the other hand, in order to actuate the linear vibration motor in a stabilized state, while suppressing the production of actuation noise, it is effective to vibrate the movable element along a guide shaft that extends in the axial direction, as in the conventional example described above. However, when the movable element is vibrated along a stationary shaft, as in the prior art, there is a problem in that the volume of the magnet is reduced by the part wherein the shaft passes through the movable element, which reduces the driving force commensurately.

In this regard, having divided guide shafts protruding on both ends of the movable element, and bearing the guide shafts, which are provided on the movable element side, on bearings that are provided on the stator side may be considered. In this case, in the assembly process, for the bearing on at least one side, the bearing must be attached to the stator after the guide shaft is inserted through the bearing. In this case, in a unit that has a frame-shaped (box-shaped) stator, there would be a problem in that the operation for attaching the bearing into the frame is inherently difficult. Moreover, it is desirable that the bearing that is attached to the interior of the frame beheld reliably in a stable state, in order to produce a stable vibration of the movable element, and in order to respond to the need to be even thinner, preferably the securing of the bearing is through securing at a position that is nearer to the bottom face of the frame.

In the present invention, the handling of such problems is an example of the problem to be solved. That is, objects of the present invention are: to enable a linear vibration motor to be made smaller and thinner, and able to produce a stabilized vibration without reducing the driving force; to simplify the attachment of bearings when a guide shaft that is provided on the movable element side is borne by the bearing that is attached to a frame-shaped stator side; to hold, reliably and in a stabilized state, a bearing that is attached to a frame-shaped stator; to hold the bearing at a position that is closer to the bottom face of the frame, to enable a reduction in thickness; and the like.

In order to achieve such an object, the linear vibration motor of the present invention is equipped with the following structures:

A linear vibration motor comprising: a frame wherein a coil is secured, and a movable element comprising a magnet portion and a weight, and which is supported elastically within the frame, wherein: the movable element comprises guide shafts that protrude on both sides in the axial direction; the frame comprises a bottom frame that has a bottom frame portion along the axial direction, and a pair of side frames that have side plate portions that face in the axial direction; the side frame has a bearing retaining portion for retaining a bearing that bears a guide shaft, and a connecting portion that connects the bearing retaining portion to the side plate portion, wherein the bearing retaining portion and the connecting portion are structured integrally with the side plate portion; and the bottom plate portion has an opening portion for engaging the bearing retaining portion.

BRIEF DESCRIPTIONS OF THE DRAWINGS

Figure 4:
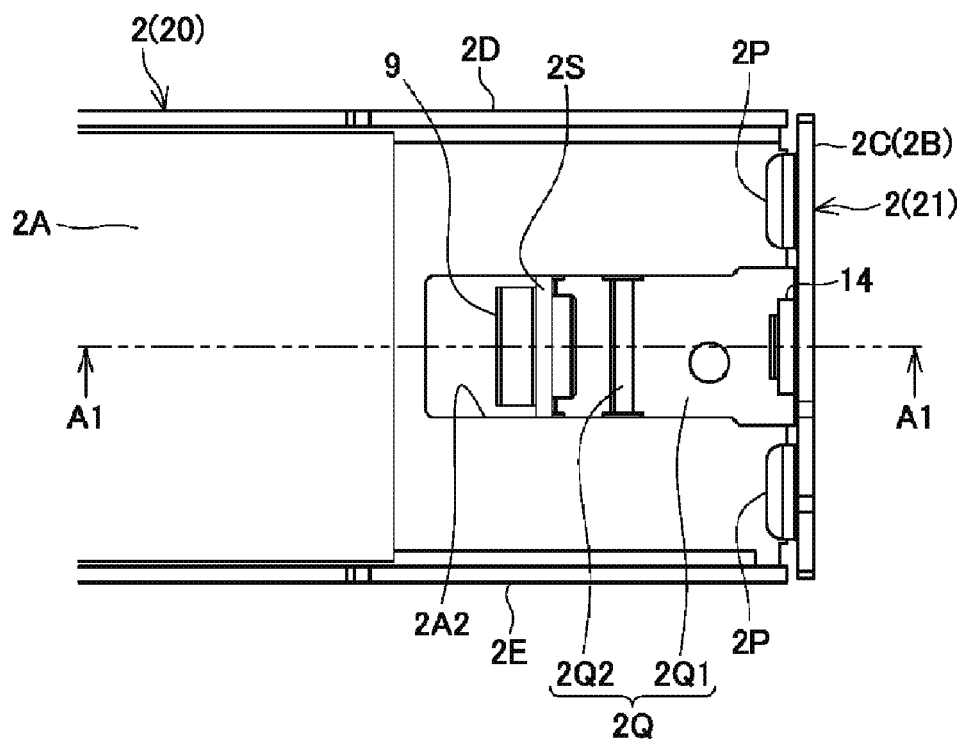
Figure 4:
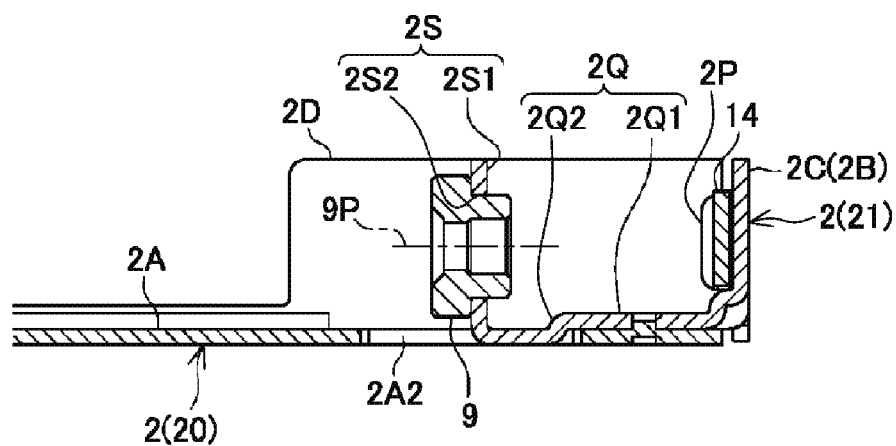

FIGS. 4(a) and 4(b) are explanatory diagrams illustrating the critical portions of a linear vibration motor according to an embodiment according to the present invention (wherein FIG. 4(a) is an interior plan view and FIG. 4(b) is an interior cross-sectional view (a cross-sectional diagram along the section A1-A1 in FIG. 4(a)).

Figure 5:
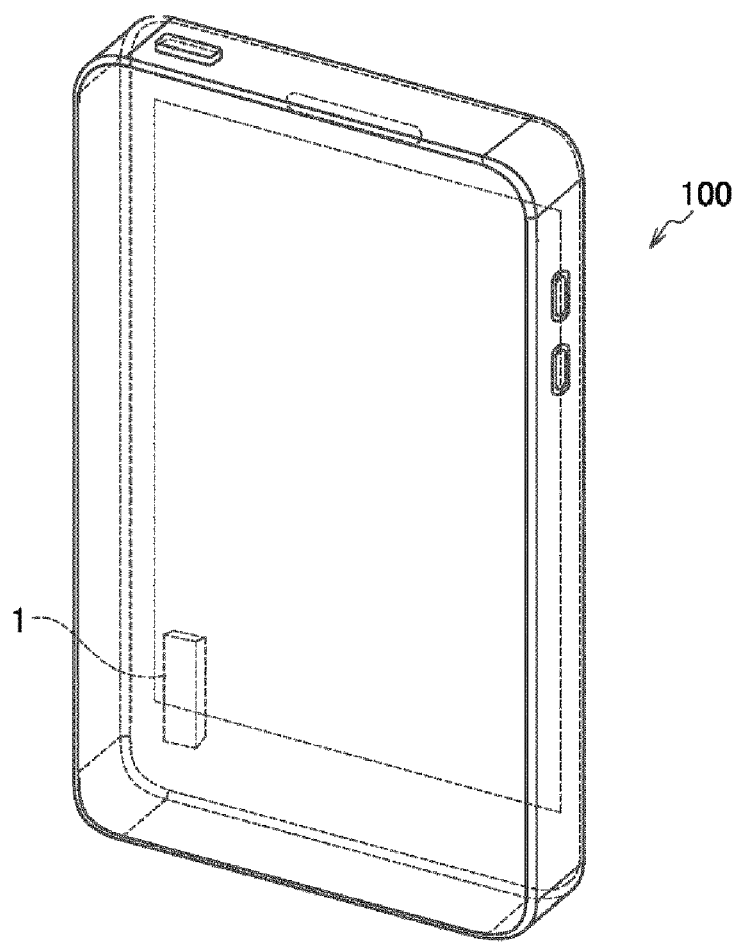

FIG. 5 is an explanatory diagram illustrating a mobile electronic device (a mobile information terminal) in which is provided a linear vibration motor according to an embodiment according to the present invention.

DETAILED DESCRIPTION

Figure 1:
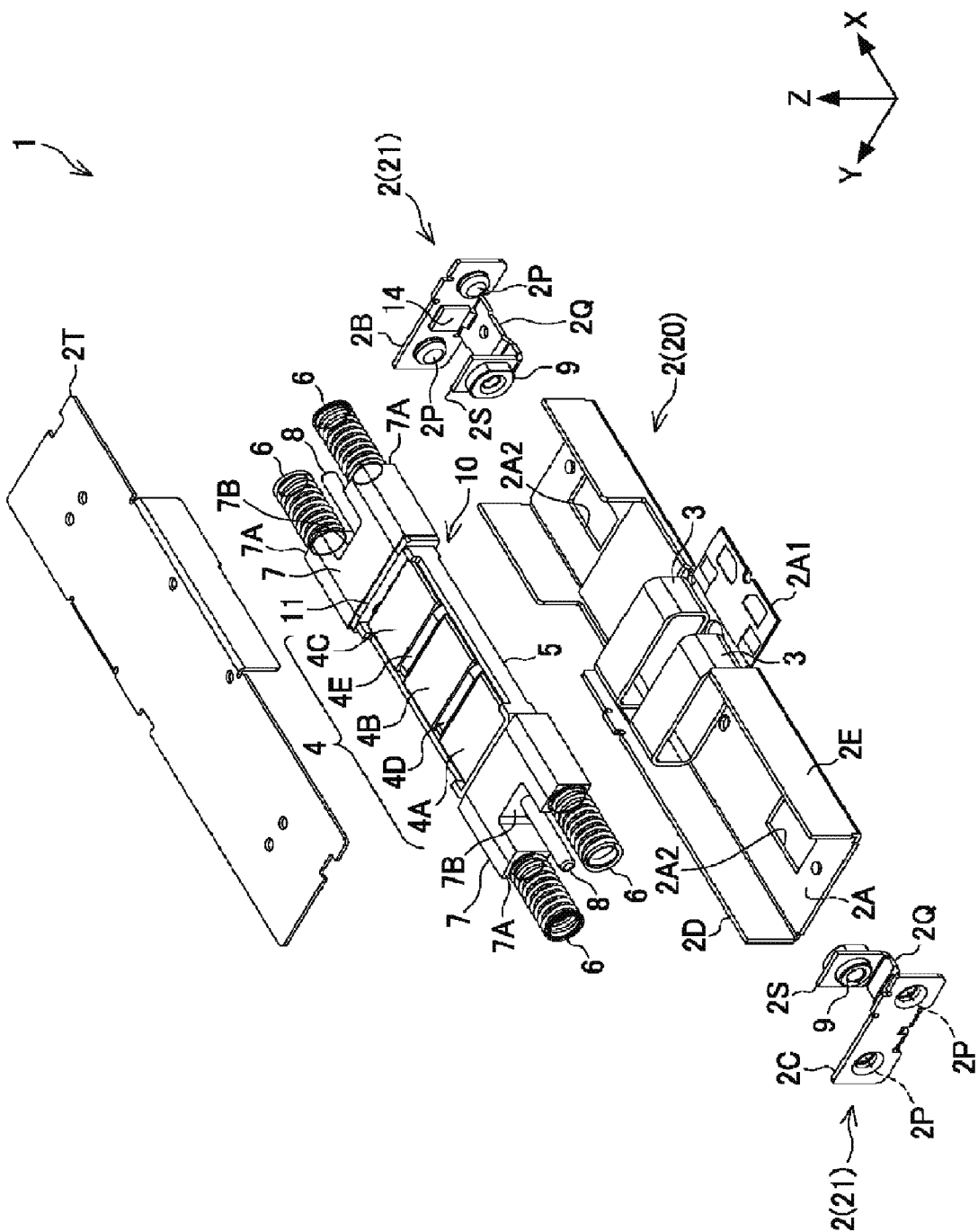
FIG. 1 is an explanatory diagram (an assembly perspective diagram) illustrating the overall structure of a linear vibration motor according to an embodiment according to the present invention.
Figure 2:
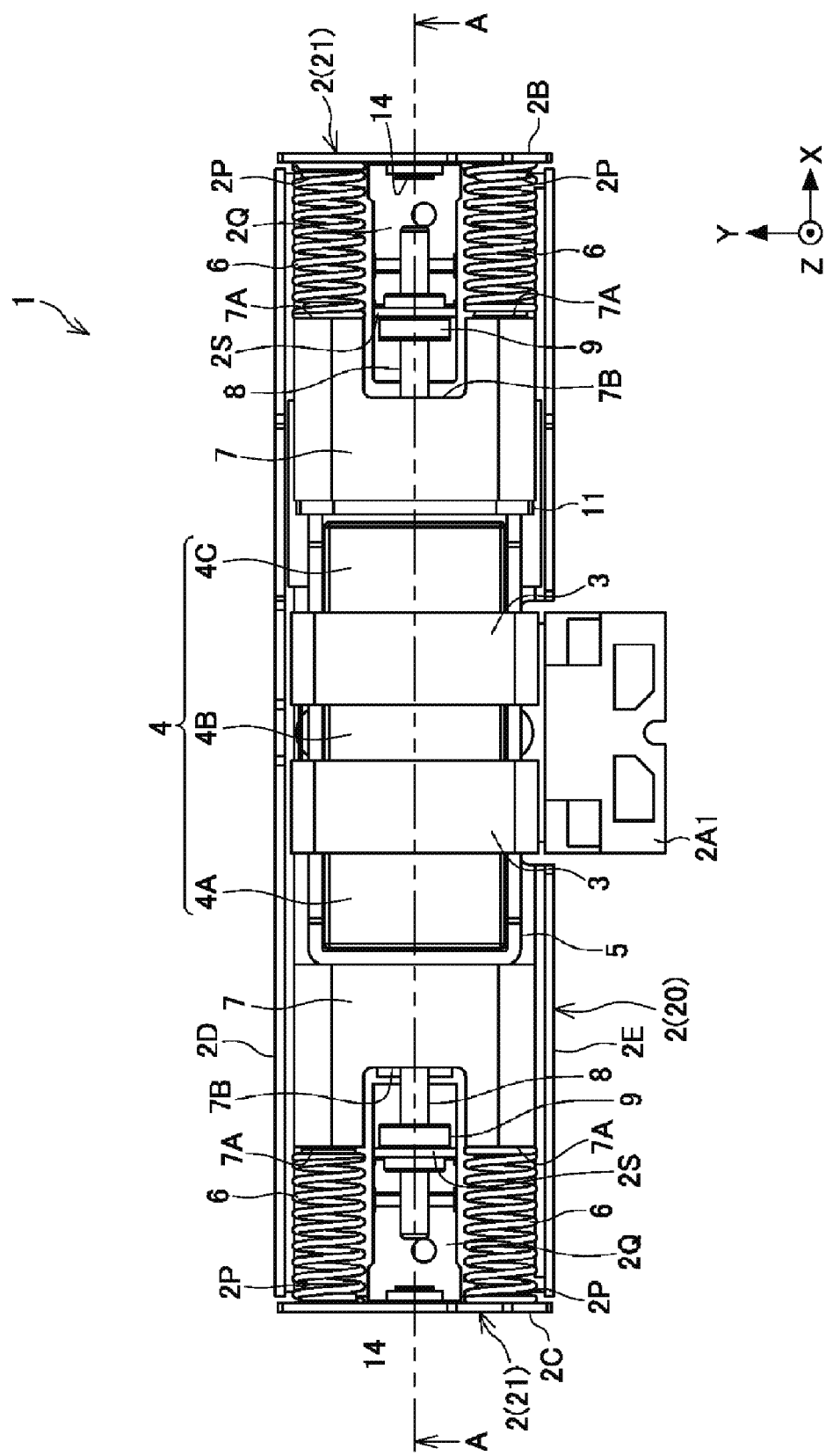
FIG. 2 is an explanatory diagram (an interior plan view) illustrating the overall structure of a linear vibration motor according to an embodiment according to the present invention.
Figure 3:
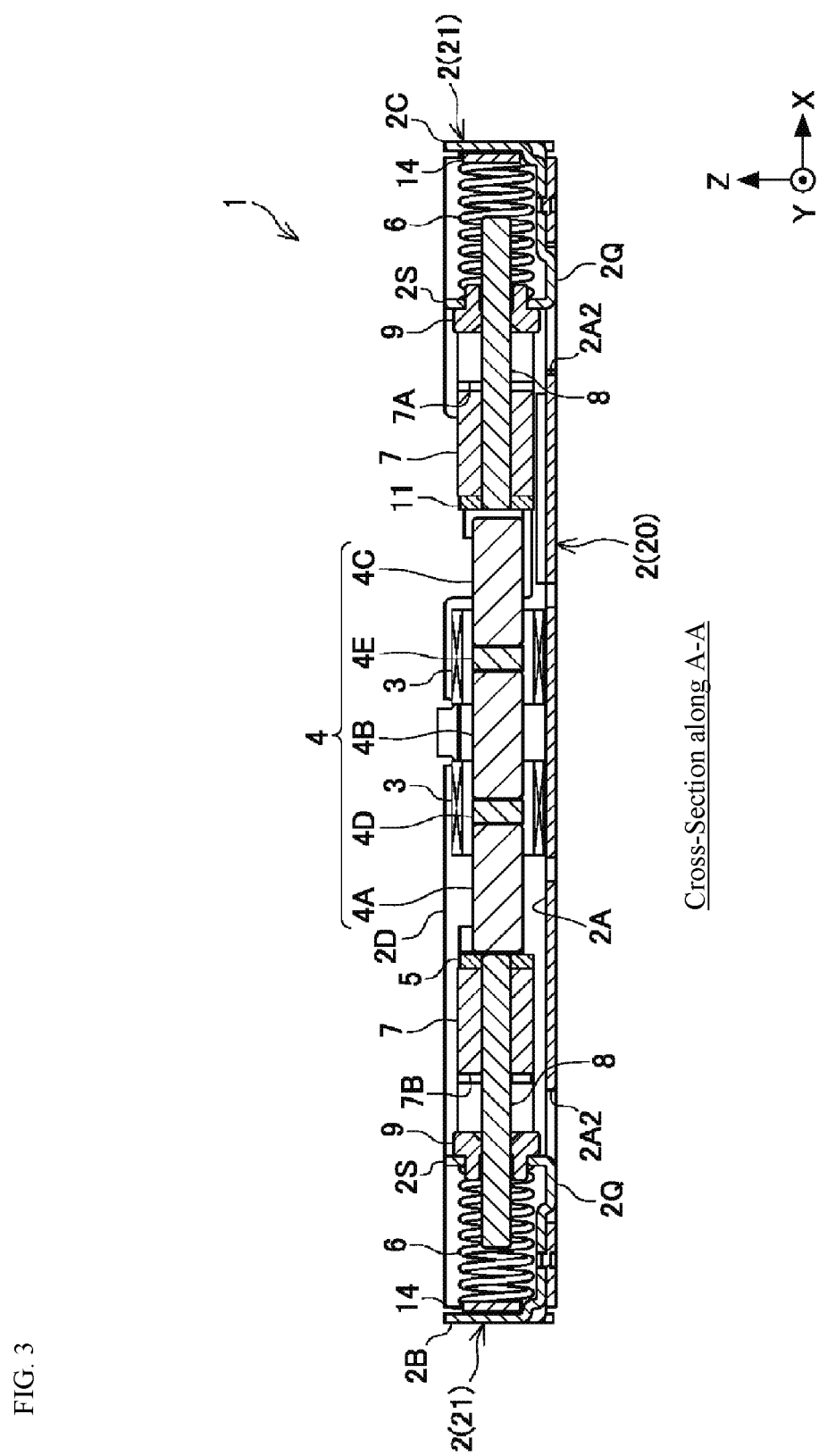
FIG. 3 is an explanatory diagram (a cross-sectional diagram along section A-A in FIG. 2) illustrating the overall structure of a linear vibration motor according to an embodiment according to the present invention.

Examples according to the present invention will be explained below, in reference to the drawings. Identical reference symbols in the different drawings below indicate positions with identical functions, and redundant explanations in the various drawings are omitted as appropriate. FIG. 1 through FIG. 3 illustrate the overall structure of a linear vibration motor according to one embodiment according to the present invention. The X direction in each of the drawings indicates the direction of vibration (the axial direction), the Y direction indicates the width direction, and the Z direction indicates the thickness (height) direction.

A linear vibration motor 1 according to an example according to the present invention comprises a frame 2 and a movable element 10. A coil 3 is secured to the frame 2, and the movable element 10 comprises a magnet portion 4 and a weight portion 7, and is supported elastically through an elastic member (a spring) 6 within the frame 2.

The frame 2 comprises a bottom frame 20 that has a bottom plate portion 2A along the axial direction, and a pair of side frames 21 that have side plate portions 2B and 2C that face in the axial direction. The side frames 21 are joined integrally, through welding, or the like, to the bottom frame 20, to structure the frame 2. In the bottom frame 20, side plate portions 2D and 2E, which extend along the axial direction, are provided on both side edges of the bottom plate portion 2A.

Moreover, the frame 2 is provided with a cover plate 2T that covers the content within the frame 2. The cover plate 2T is formed in a rectangular plate shape, attached to the top end faces of the side plate portions 2B through 2E. The frame 2 can be formed through machining (pressing processes, etc.) on a metal plate. In the example that is illustrated, the frame 2 has an essentially rectangular solid shape (a box shape) wherein the dimension in the direction of thickness (the Z direction in the figure) is less than the dimension in the direction of width (the Y direction in the figure), and the dimension in the direction of vibration (the X direction) in the figure is greater than the dimension in the width direction.

In the linear vibration motor 1, a driving portion is structured from a coil 3 and a magnet portion 4. A vibration-generating current (for example, a pulsed current at a resonant frequency that is determined by the mass of the movable element 10 and the coefficient of elasticity of the elastic member 6) is inputted into the coil 3 from a signal inputting portion 2A1 that is provided on the frame 2, to produce Lorentz forces (driving forces) along the axial direction (the X direction in the figure) in the magnet portion 4.

In the magnet portion 4, a plurality of flat rectangular magnet pieces 4A, 4B, and 4C, which are magnetized along the axial direction (the X direction in the figure) are disposed with identical poles adjacent to each other, and spacers 4D and 4E are connected held therebetween. Here the spacers 4D and 4E may be of either magnetic materials or non-magnetic materials, and the distance between the magnet pieces 4A, 4B, and 4C, wherein the identical poles are disposed adjacent to each other, may be set to an appropriate distance. While in the example that is illustrated there are three magnet pieces 4A, 4B, and 4C that are connected together, this may instead be two pieces, or may be four pieces or more. If necessary, the magnet portions 4 may be integrated together through reinforcing members 5.

The coil 3 is a wire wrapped, along the Y and Z directions, around the magnet portion 4 wherein the direction of the magnetic pole faces in the X direction, and the top face and/or bottom face thereof, and, if necessary, a side face or faces as well, is/are secured to an interior face or faces of the frame 2. Securing of the coil 3 to the frame 2 may be through securing directly to the frame 2, or the coil 3 may be wound onto a coil bobbin with the coil bobbin secured to the frame 2.

In the movable element 10, weight portions 7 are connected to both end portions of the magnet portion 4 in the axial direction (the X direction in the figure). The weight portion 7 may be structured through, for example, a metal material with a high specific density (such as tungsten), and, in the example that is illustrated, has a rectangular cross-sectional shape that has a Z-direction height that is greater than the thickness of the magnet portion 4, and a width in the Y direction that is greater than the width of the magnet portion 4. Weight portions 7 are connected to both end portions, in the axial direction (the X direction in the figure) of the magnet portion 4, through a reinforcing member 5 and a connecting member 11.

The movable element 10 comprises guide shafts 8 that protrude on both sides in the axial direction thereof. They guide shafts 8 are disposed split along one axial direction (the X direction in the figure), for example, with one end side of each secured to the weight portions 7, and the other end sides thereof forming free ends that protrude in mutually opposing directions. Preferably the guide shaft 8 is disposed coaxially with the centroid axis of the movable element 10, to guide the vibration of the movable element 10 along the axial direction. In the example that is illustrated, the weight portions 7 comprise guide shaft supporting portions 7B for supporting guide shafts 8. The guide shaft supporting portions 7B are recessed parts that extend along the axial direction from the end portions 7A of the weight portions 7.

The guide shafts 8 are borne by bearings 9 are held on the frame 2. The bearings 9 are held in bearing retaining portions 2S on the side frames 21. The side frames 21 are provided with bearing retaining portions 2S and connecting portions 2Q that connect the bearing retaining portions 2S to side plate portions 2B and 2C, where the side plate portion 2B (2C) is structured integrally with the bearing retaining portion 2S and the connecting portion 2Q. Shock absorbing members 14, for absorbing the impact when the end portions of the guide shaft 8 strike, are provided on the inner surfaces of the side plate portions 2B and 2C.

The elastic members 6 are disposed non-coaxially with the guide shafts 8 along the axial direction, and apply, to the movable element 10, elastic forces that oppose the driving forces produced by the coil 3 and the magnet portion 4. In the example that is illustrated, coil springs, that elongate and are compressed along the axial direction (the X direction) are used as the elastic member 6, where two elastic members 6 on each side are interposed between the end portions 7A of the weight portions 7 and the side plate portions 2B and 2C of the side frame 21. In the example that is illustrated, the elastic members 6 are disposed in parallel with the guide shaft 8, with one end of the elastic member 6 engaged with a support protrusion 2P that is provided on the side plate portion 2B or 2C, and the other end of the elastic member 6 engaged with the end portion 7A of a weight portion 7.

An example of the process for assembling such a linear vibration motor 1 will be explained. After the coil 3 is secured to the bottom frame 20, and before the weight portions 7 are connected to both ends of the magnet portion 4, the magnet portion 4 is inserted into the coil 3. At this time, in a state wherein one of the weight portions 7 is connected to one end side of the magnet portion 4, the magnet portion 4 is inserted into the coil 3, after which the other weight portion 7 is connected to the other end side of the magnet portion 4. Thereafter, the side edges of the side plate portions 2B and 2C of the side frames 21 are joined, through welding, or the like, to the side edges of the side plate portions 2D and 2E of the bottom frame 20 while the guide shafts 8 that protrude from the weight portions 7 are inserted in the bearings 9 that are held by the bearing retaining portions 2S of the side frames 21. After the side frames 21 have been joined to the bottom frames 20, the elastic members 6 are installed between the end portions 7A of the weight portions 7 and the insides of the side plate portions 2B and 2C.

When the bottom frame 20 and the side frames 21 are joined together, the bottom plate portion 2A of the bottom frame 20 has an opening portion 2A2, into which the bearing retaining portion 2S of the side frame 21 engages (fits), where the bearing retaining portion 2S that holds the bearing 9 has a lower portion thereof fitted into the opening portion 2A2.

FIGS. 4(a) and 4(b) illustrate in detail the state wherein the bottom frame 20 and the side frames 21 have been joined together (wherein the weight portions, the guide shafts, and the elastic members are not shown). The bearing retaining portion 2S of the side frame 21 has a supporting plate part 2S1 that is provided protruding from an end portion of the connecting portion 2Q, and a hole part 2S2, open in the supporting plate part 2S1, into which the bearing 9 is secured. Moreover, the connecting portion 2Q has an extending part 2Q1 that extends along the bottom plate portion 2A of the bottom frame 20 from the side plate portion 2C (2B), and a stepped portion 2Q2 for guiding, to the opening portion 2A2 of the bottom plate portion 2A, the lower portion of the bearing retaining portion 2S.

In this way, through a structure wherein the lower portion of the bearing retaining portion 2S in the side frame 21 is fitted into the opening portion 2A2 of the bottom frame 20, both side edges of the bearing retaining portion 2S, with the bearing 9 held therebetween, are caused to contact the inside edges of the opening portion 2A2, enabling the bearing 9 to be held in a stabilized state. Moreover, the lower portion of the bearing retaining portion 2S fitting into the opening portion 2A2 enables an adequate width of the lower portion of the hole part 2S2 in the supporting plate part 2S1 to be secured, even when the axis 9P of the bearing 9 is near to the bottom plate portion 2A, making it possible to prevent deformation of the hole part 2S2 when forming the supporting plate part 2S1 through machining by bending from the connecting portion 2Q. This also enables the bearing 9 to be held stably. Moreover, because the axis 9P of the bearing 9 can be disposed near to the bottom plate portion 2A, this enables the linear vibration motor 1 to be made thinner.

In such a linear vibration motor 1, the guide shaft 8 is divided so as to not pass through the magnet portion 4, enabling securing of a magnet volume that enables production of an adequate driving force through a magnet portion 4 that is wide in the Y direction and thin in the Z direction, independent of the diameter of the guide shaft 8. This enables the production of a thin linear vibration motor 1 able to produce a sufficient driving force.

Moreover, in the illustrated example, the elastic members 6 are disposed non-coaxially with the guide shafts 8, enabling the diameters of the elastic members 6 to be reduced, independently of the diameters of the guide shafts 8. When the diameters of the elastic members 6 are reduced, the elastic force can be set as appropriate through the selection of the material for the elastic members 6, and through providing a plurality of elastic members 6 in parallel. This can also reduce the thickness of a linear vibration motor 1 wherein a movable element 10 is supported on a shaft.

Moreover, the amplitude of the movable element 10 in the linear vibration motor 1 is limited by the lengths with which the individual guide shafts 8 protrude. In the example that is illustrated, a guide shaft supporting portion 7B is provided that is recessed from the end portion 7A of the weight portion 7, and the guide shaft 8 protrudes therefrom, making it possible to secure a sufficient amplitude, while suppressing the axial direction length of the linear vibration motor 1, enabling miniaturization. The guide shaft supporting portion 7B of the weight portion 7 is provided with a width that is able to contain a bearing retaining portion 2S, where the bearing retaining portion 2S is inserted into the guide shaft supporting portion 7B to secure a large amplitude for the movable element 10.

Additionally, in the linear vibration motor 1, when the movable element 10 that is equipped with the guide shaft 8 is assembled into the frame 2, the bearing 9 is stored in advance in the side frame 21, enabling the side frame 21 to be joined together with the bottom frame 20 while passing the guide shaft 8 through the bearing 9, enabling a simplification of the assembly operation for installing the bearing 9, through which the guide shaft 8 extends, into the frame 2. At this time, the bearing retaining portion 2S is fitted into the opening portion 2A2 of the bottom plate portion 2A, enabling the bearing 9 to be held in a stable state.

As explained above, the linear vibration motor 1 according to the example according to the present invention enables production of a stabilized vibration while preventing a reduction in the driving force and enabling the linear vibration motor 1 to be made smaller and thinner. Moreover, when the guide shafts 8 that are provided on the movable element side are borne on the bearings 9 that are attached to the frame 2 side, the attachment of the bearings 9 is simplified. Furthermore, the bearings 9 that are attached to the frame 2 can be held reliably in a stabilized state, and the bearings 9 can be positioned nearer to the bottom plate portion 2A of the frame 2, enabling a reduction in thickness.

FIG. 5 shows a mobile information terminal 100 as an example of an electronic device equipped with a linear vibration motor 1 according to an embodiment according to the present invention. The mobile information terminal 100 that is equipped with the thin and light linear vibration motor 1 that is able to produce a stabilized vibration can communicate to users, through stabilized vibrations that tend not to produce noise, incoming calls in a communication function, or the beginning or end of an operation, such as an alarm function. Moreover, this makes it possible to produce a mobile information terminal 100 that facilitates superior mobility and design quality through making the linear vibration motor 1 thinner and smaller. Furthermore, because the linear vibration motor 1 is of a compact shape wherein the various components are contained within a frame 2 of a rectangular shape wherein the thickness is suppressed, it can be mounted, with excellent space efficiency, within a thinner mobile information terminal 100.

While embodiments according to the present invention were described in detail above, referencing the drawings, the specific structures thereof are not limited to these embodiments, but rather design variations within a range that does not deviate from the spirit and intent of the present invention are also included in the present invention. Moreover, insofar as there are no particular contradictions or problems in purposes or structures, or the like, the technologies of the various embodiments described above may be used together in combination.

The invention claimed is:

1. A linear vibration motor comprising:
a frame wherein a coil is secured, and
a movable element comprising:
- a magnet portion supported elastically within the frame,
- a weight, and
- a guide shaft that protrudes on both sides in the axial direction;

wherein the frame comprises:
- a bottom frame comprising:
  - a bottom plate along the axial direction, and
  - a pair of side frames comprising side plates that face in the axial direction;

wherein the side frame has comprises:
- a bearing retaining portion retaining a bearing that bears the guide shaft, and
- a connecting portion that connects the bearing retaining portion to the side plate portion, wherein the bearing retaining portion and the connecting portion are structured integrally with the side plate portion; and wherein the bottom plate comprises an opening engaging the bearing retaining portion.

2. The linear vibration motor as set forth in claim 1, wherein:
both side edges which hold the bearing of the bearing retaining portion therebetween contact the inner edge side of the opening portion.

3. The linear vibration motor as set forth in claim 1, wherein:
the connecting portion has an extending part that extends from the side plate portion along the bottom plate, and a stepped part for guiding the bearing retaining portion to the opening.

4. The linear vibration motor as set forth in claim 1, wherein:
the bottom frame equips the side plate portions integrally, along the axial direction, with both side edges of the bottom plate.

5. The linear vibration motor as set forth in claim 1, wherein:
the bearing retaining portion has a supporting plate that protrudes from an end portion of the connecting portion, and a hole part that is open in the supporting plate and in which the bearing is secured.

6. A mobile electronic device comprising a linear vibration motor as set forth in claim 1.

* * * * *